Aug. 4, 1936.　　J. M. CHRISTMAN　　2,049,689
MOTOR VEHICLE
Filed Feb. 4, 1932
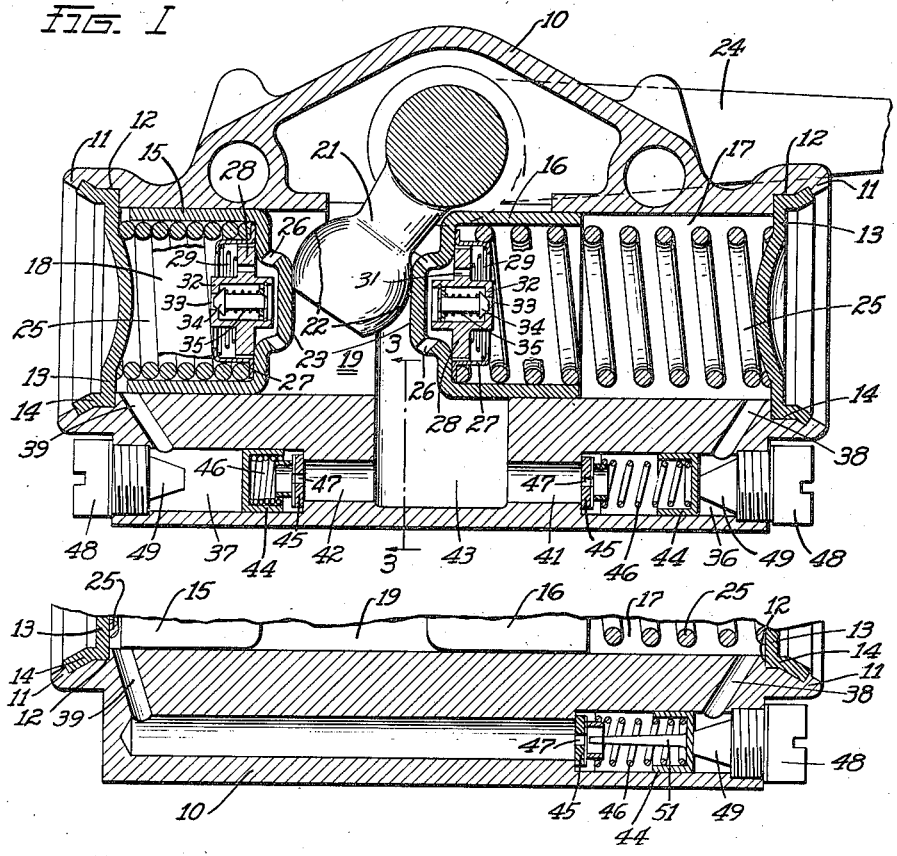
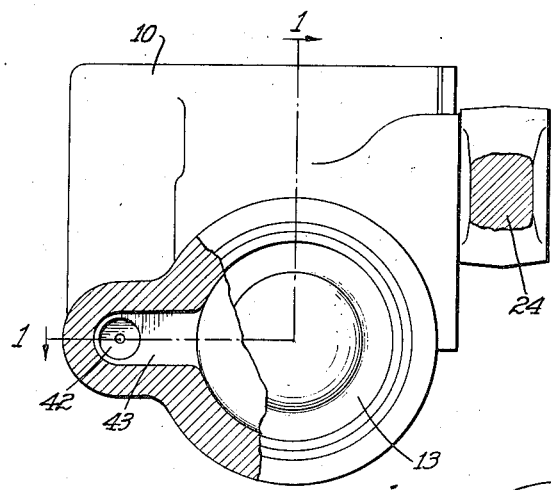
Inventor
JOHN M. CHRISTMAN.
By Miller Tibbetts
Attorney Patented Aug. 4, 1936

2,049,689

UNITED STATES PATENT OFFICE 2,049,689

MOTOR VEHICLE

John M. Christman, Detroit, Mich., assignor to Packard Motor Car Company, Detroit, Mich., a corporation of Michigan Application February 4, 1932, Serial No. 590,822

6 Claims. (Cl. 267—8)

This invention relates to motor vehicles and more particularly to shock absorbers therefor.

In motor vehicles equipped with shock absorbers of conventional design between the axles and the chassis frame, small amplitude road shocks or vibrations, such as are encountered during an ordinary boulevard ride, are insufficient to cause the suspension springs to noticeably compress due to the resistance set up by the shock absorber. Shock absorbers, however, are considered necessary to control the rate of the spring deflections when the vehicle encounters major road irregularities. A desirability has, therefore, been felt in the industry for a shock absorber which will permit the natural initial deflection of the suspension springs when minor road irregularities are encountered, and at the same time will provide the necessary resistance to or control of the spring deflections when large bumps or irregularities are encountered.

An object of the present invention is to provide a hydraulic shock absorber for a motor vehicle in which the shock absorbing qualities are negligible when the vehicle is subjected to only minor road shocks.

Another object of the invention is to provide a motor vehicle with shock absorbers between the axles and the frame thereof which will permit the natural unrestricted deflection of the suspension springs when the vehicle strikes minor road irregularities but which will function normally as a shock absorber to control the spring deflections when the vehicle encounters larger irregularities in the road.

These and other objects of the present invention will become apparent from a reading of the following description taken in connection with the accompanying drawing which forms a part of this specification, and in which:

Fig. 1 is a view partially in longitudinal vertical section and partially in horizontal section taken substantially on the line 1—1 of Fig. 3, Fig. 2 is a fragmentary view similar to that of Fig. 1 showing a modification of the present invention, and Fig. 3 is an end elevational view of a shock absorber embodying the present invention with a portion thereof broken away and shown in section, the sectional view being taken substantially on the line 3—3 of Fig. 1, showing the connecting chamber between the fluid reservoir and the auxiliary chambers or passage-ways.

Referring to the drawing, reference numeral 10 indicates the casing of a hydraulic shock absorber embodying the present invention. The casing is formed with an interior hollow cylindrical chamber extending the full length thereof. The casing member at its ends and adjacent the ends of the cylindrical chamber is provided with lip portions 11 and shoulder portions 12 to receive caps or closure members 13 which fit tightly within the casing walls to form a closed liquid-tight chamber. These closure members are formed with a flange 14 and are adapted to be inserted in the open ends of the cylindrical chamber and to rest on the shoulder portions 12 of the casing. The flanges 14 of the closure members may be spun in under the lips 11 by any suitable well-known spinning tool.

A pair of oppositely disposed pistons 15 and 16 are positioned for reciprocatory movement within the cylindrical chamber and separate three chambers therein, the piston 16 defining what may be termed the rebound chamber 17 in one end of the casing and the piston 15 defining a compression chamber 18 in the opposite end thereof. As the pistons are spaced from each other, a fluid reservoir 19 is formed between the adjacent ends thereof. The reservoir may be provided with a suitable removable closure member, not shown, for the purpose of filling the shock absorber with fluid.

The pistons are designed to be reciprocated within the casing to compress the fluid within their respective working chambers. For this purpose a rocker lever 21 extends into the cylindrical chamber through a recess in the casing wall and is formed with semi-spherical bearing surfaces 22 to contact the outer bearing faces 23 of the piston heads. The rocker lever extends through the casing wall and is secured to an operating arm 24 which may be secured to a movable part of the vehicle, such as a spring mounted axle movable relative to the vehicle frame members upon receiving a shock. The casing or body portion of the shock absorber may be secured to a frame member in the well-known manner. It will be understood that upon movement of the axle relative to the frame, the suspension springs will be deflected and the arm 24 will be actuated. Movement of the arm 24 will transmit motion to the rocker lever 21 whereby the pistons 15 and 16 will be reciprocated within the chamber to alternately compress the fluid in their respective working chambers 17 and 18. Compression springs 25 are provided between the closure members 13 and the piston heads to yieldingly urge the pistons toward their retracted positions.

The piston heads are formed with ports 26 which connect the interior thereof with the reservoir 19 so that fluid may flow from the reservoir to the interior of the piston and vice versa. Flanged ring members 27 are provided interiorly of the pistons and are maintained in position against the head portions thereof by the compression springs 25. Flat valve members 28 are positioned within the ring members 27 in spaced relation to the ports 26 and are urged to seated position against the piston heads by light compression springs 29 which bear against the underside thereof and against the flanged portions of the ring members 27. These valve members are designed to be opened by the force of the fluid flowing from the reservoir into the piston on the retracting stroke thereof whereby the piston chambers may be quickly filled with fluid. Each of the valve members is provided with a port 31 which establishes constant communication between the interior of the pistons and the fluid reservoir 19 through the ports 26 in the piston heads. The valve members 28 are also provided with housings 32 centrally thereof, which are open at one end toward the piston head and have a port 33 in the other end thereof communicating with the interior of the piston and the fluid chamber. The ports 33 are opened and closed by one-way valves 34 which are urged to closed position by small springs 35 but which are designed to open against the spring pressure at a predetermined fluid pressure within the piston chambers on the compression stroke of the pistons so that a suitable fluid pressure relief is afforded permitting the pistons to be compressed under yielding fluid pressure opposition.

From the above description it will be apparent that as the rocker arm 21 is moved, for instance to the right, the piston 16 will be displaced within the chamber 17 against the action of the compression spring 25. As the pressure increases due to the compression of the fluid in the chamber 17 the valve 34 will open against the action of the spring 35 thereby allowing a restricted relief for the compressed fluid within the chamber. The fluid will now flow through the port 33 and ports 26 into the fluid reservoir 19. As the rocker arm 21 is moved in the opposite direction, or to the left, to compress the piston 15 the compression spring 25 in the chamber 17 will move the piston 16 towards its retracted position. As the pressure is relieved within the chamber 17 due to the retraction of the piston, the small valve 34 will close and the piston will begin to fill with fluid from the reservoir through the ports 26 and the port 31 in the valve 28. The spring 29 which urges the valve 28 to seated position is comparatively light and as the piston moves to retracted position, the valve will be unseated by the pressure of the fluid flowing from the reservoir, allowing a comparatively large amount of fluid to flow to the interior of the piston and the fluid chamber. By this construction it will be seen that the piston is quickly refilled during its retracting stroke, and that a restricted flow of fluid is permitted from the interior of the piston and the fluid chamber to the fluid reservoir 19 upon the compression stroke thereof. The action of the compression piston 15 is identical with that just described.

The casing 10 adjacent the cylindrical working chambers is formed to provide small auxiliary chambers 36 and 37 which communicate with the piston chambers 17 and 18 by passage-ways 38 and 39 respectively. The auxiliary chambers are connected to the fluid reservoir 19 by passage-ways 41 and 42 respectively which in turn communicate with a chamber 43 leading to the reservoir.

As previously pointed out, it is an object of this invention to provide means whereby the shock absorbers offer little or no resistance to the deflection of the vehicle suspension springs during their initial movement. To accomplish this object relief means are provided whereby fluid compression in the cylinders 17 and 18 does not take place upon the initial compression movement of the pistons. This relief means comprises small reciprocating pistons 44 provided in each of the chambers 36 and 37. Valves 45 are provided between the interior of the chambers 36 and 37 and the passage-ways 41 and 42 respectively and light compression springs 46 are positioned between the pistons 44 and the valves 45 so that the valves are urged to closed position over the passage-ways 41 and 42 and the pistons 44 are urged toward their retracted position within the chambers 36 and 37. The valves 45 have small ports 47 therethrough which establish constant restricted fluid communication between the passage-ways 41 and 42 and the interior of the chambers 36 and 37. The auxiliary chambers may be provided with suitable removable closure members 48 providing ready access to the interior thereof. These closure members are threaded into the casing and extend into the interior of the chambers 36 and 37 and may be provided with suitable projections 49 which form stops for the pistons 44 preventing closure of the passage-ways 38 and 39, when the pistons are retracted.

On meeting a small irregularity or obstruction in the road, pistons 15 and 16 will be displaced to the left only slightly, and the small piston 44 in the auxiliary chamber 37 will be displaced to the right, thus relieving the pressure on the fluid in the compression chamber or cylinder 18 to materially reduce the resistance offered by the shock absorber to movement of the vehicle suspension springs, the latter being only slightly compressed. As they tend to expand or rebound the arm 24 will be moved upwardly moving the rocker lever 21 to the right to compress the piston 16. As the piston 16 starts to move to the right, fluid will be forced from the chamber 17 into the auxiliary chamber 36 and the piston 44 in this chamber will be moved to the left against the action of the weak spring 46. It will be seen that such movement of the piston 44 in the auxiliary chamber will enlarge this chamber so that a small amount of fluid may flow from the working chamber 17. As the piston 44 moves to the left it will force the fluid before it through the port 47 so that the fluid movement from the chamber 36 into the passage-way 41 is slightly restricted, thus offering a very slight resistance to the movement of the piston 44. It will be seen then that a small amount of fluid is passed from the chamber 17 into the auxiliary chamber 36, upon the initial compression movement of the piston 17 so that comparatively little resistance is offered to such movement. As soon as the piston 44 reaches the end of its stroke in the auxiliary chamber 36, the fluid flow from the chamber 17 to the auxiliary chamber will have ceased and an increased fluid resistance will be offered to the movement of the piston 16. As the piston continues in its compression stroke and the pressure of the fluid in the chamber 17 increases, the valve 34 will open against the action of the spring 35 allowing a restricted relief of the fluid in the chamber through the ports 26 in the piston head into the reservoir 19. As the piston 16 retracts due to the force of the compression spring 25, the pressure will be relieved in the auxiliary chamber 36 and the small piston 44 will be retracted by the spring 46. Upon such movement fluid will flow from the chamber 43 which communicates with the reservoir, into the passage-way 41 unseating the small valve 45 and allowing a quick refill of the chamber 36. As previously described, the chamber 17 is filled with fluid through the valve 28 upon the retracting stroke of the piston 16. It will be understood that the action of the piston 15 and the small piston in the auxiliary chamber 37 is identical with that just described.

From the foregoing it will be seen that comparatively little or no resistance is offered to the initial compression movements of the shock absorber pistons but that an increased resistance is offered to the continued compression stroke thereof. It will be apparent then that there is substantially no resistance offered to the deflection of the vehicle suspension springs when minor road irregularities are encountered and that upon receiving a larger shock the rate of deflection of the springs will be controlled by the increased resistance of the shock absorber.

Where the suspension springs and the shock absorbers are subjected to only minor shocks it is considered more important that the rebound piston of the shock absorber have a free unresisted initial movement thereof than it is for the compression piston. This is based on the fact that in shock absorbers of conventional design, a rapid succession of small shocks tends to compress the rebound piston more than it is retracted. This is due to the fact that there is some fluid pressure resistance to the movement of this piston at all times. Where the shock absorber is thus subjected to a rapid succession of small shocks, the rebound piston will tend to be completely compressed so that the suspension springs of the vehicle will be held in substantially their compressed position. Naturally, with the suspension springs thus compressed, the shock absorbing qualities of the spring suspension system are lost and the shocks imparted to the wheels and axles are transmitted through the springs and frame and are sharply felt by the occupants of the vehicle. In practice, the orifice in the compression piston is sometimes constructed to provide less restriction to the piston movements than the rebound piston orifice and therefore the compression piston is more easily and quickly compressed. In some instances, therefore, especially where a cheap construction is desirable, it has been found satisfactory to construct the shock absorber with a fluid relief chamber for the rebound piston only. Such a construction is disclosed in the modification shown in Fig. 2.

In the structure disclosed in Fig. 1, when the small pistons 44 strike the end of the chambers 36 or 37 the pistons 15 or 16 will momentarily stop in their movement, sometimes transmitting a slight shock through the frame to the occupants of the vehicle before it continues in its compression stroke. Under some circumstances, therefore, it may be desirable to gradually and increasingly restrict the movement of this small piston 44 toward the end of its stroke so that no sharp shock will be felt. In Fig. 2, a construction accomplishing this result is disclosed. As shown, the head of the piston 44 is provided with a tapered metering pin 51 adapted to register with the port 47 in the valve 45. As shown, when the piston 44 is in its fully retracted position, the end of the metering pin is slightly spaced from the opening of the port 47. As the piston 44 is moved to the left, the metering pin 51 will enter and gradually restrict the port 47 until such time as the piston 44 is completely compressed when the port will be closed. In this manner the initial movement of the piston 44 is not substantially restricted but as the piston moves toward the end of its stroke the movement will be gradually retarded so that there will be no shock transmitted through the mechanism at the time this small piston reaches the end of its stroke. In this construction there is a continuous connecting passage-way between the compression chambers 15, 17 and 18, there being no communicating chamber connecting the passage-way to the reservoir as in the preferred embodiment. In this modification the auxiliary chamber will be filled by the fluid forced into the passage-way when the piston 15 is displaced. It will be understood that the remaining construction of this embodiment is the same as that disclosed in Fig. 1.

From the foregoing description it will be seen that a shock absorber has been provided for use on motor vehicles between the axles and frames thereof whereby the rate of deflection of the suspension springs will be in direct proportion to the applied load placed thereon during a portion of the spring movement and proportionate to the difference between the applied load and the force required to overcome the fluid pressure resistance to the movement of the shock absorber pistons during the balance of the spring movement. In this manner a "free center" shock absorber is provided in which the shock absorbing qualities are negligible when it is subjected to only minor shocks but which upon receiving a shock of any great magnitude will act to control the deflection of the suspension springs of the vehicle to absorb the shock in the usual manner.

It will of course be appreciated that fluid discharged from either of the auxiliary chambers on displacement of the small piston 44 therein may be delivered to a fluid supply reservoir such as shown at 43 in Figure 1 or to the cylinder in which the opposite piston 15 or 16 moves as suggested in Figure 2. In either event it may be correctly stated that fluid is discharged from the auxiliary chamber and from the passages 26 in the associated piston into a common chamber. Thus if the pistons 15 and 16 are moved slightly to the left, and the left-hand small piston 44 moves to the right, the fluid from the auxiliary chamber and from the cylinder 18 are both delivered into the cylinder 17 through the passages 26 in the piston 16, so that it is not material whether the fluid from the auxiliary chambers flows directly into the storage reservoir 43 and thence to the cylinder 17 or directly into the cylinder 17 as suggested in Figure 2.

While only two embodiments have been shown and described, it will be apparent that the invention is susceptible of numerous other changes in construction and design without departing from the spirit or scope thereof which is to be limited only by the appended claims.

Having thus described the invention, what is claimed and desired to be secured by Letters Patent is:

1. In a hydraulic shock absorber, a fluid containing casing formed to provide a piston chamber, a piston movable in the chamber, a fluid containing auxiliary chamber connected to the piston chamber and having a fluid escape port, an auxiliary piston within the auxiliary chamber movable to force the fluid therein through the movable to force the fluid therein through the adapted to register with the port to increasingly restrict the fluid flow therethrough.

2. In a hydraulic shock absorber, a casing formed with fluid containing chambers and a passage-way connected at its ends to the chambers, oppositely disposed compression pistons movable in the chambers, means for moving the pistons to alternately force the fluid out of each compression chamber into the passageway, an auxiliary chamber formed in the passage-way, and an auxiliary piston in the chamber movable by the pressure of the fluid flowing from one of the compression chambers to enlarge the auxiliary chamber whereby a limited relief is afforded for the fluid in said compression chamber permitting substantially unopposed movement of one of said compression pistons during a portion of its movement, said auxiliary piston having means associated therewith for retracting it whereby the auxiliary chamber may fill with fluid upon the compression movement of the other of said compression pistons.

3. In a hydraulic shock absorber, a fluid containing casing, a chamber in the casing, a movable piston in the chamber, a reservoir in the casing, an auxiliary chamber in the casing in open communication at one end with the chamber and at the other end with the reservoir, a pair of movable elements in the auxiliary chamber, and spring means normally spacing said elements, one of said elements serving as an abutment to prevent flow through the auxiliary chamber, said abutment element being movable under fluid pressure developed by initial movement of the piston in the chamber to increase the capacity of the auxiliary chamber in open communication with the chamber.

4. In a hydraulic shock absorber, a fluid containing casing, a chamber in the casing, a piston movable in the chamber, a reservoir adapted to be connected with the chamber through the piston head, an auxiliary chamber connected at one end with the reservoir and at the other end with the chamber, an abutment member in the auxiliary chamber preventing flow therethrough, another abutment member in the auxiliary chamber nearest to the connection with the reservoir, said last mentioned abutment member having an opening therethrough, and a coil spring normally spacing said abutment members, the first mentioned abutment member being movable in response to fluid pressure in the chamber to increase the size of the auxiliary chamber open to the piston chamber upon initial compression movement of the piston.

5. In a fluid shock absorber for motor vehicles, the combination with a cylinder, of a piston moving in said cylinder in response to relative movement of the vehicle road wheels and frame, a restricted passage for discharge under pressure of fluid from the head end of said cylinder on continued movement of the piston toward the latter into a fluid chamber, and means for relieving the fluid pressure applied by the piston during relatively small movement of the latter from a neutral position toward the head end of said cylinder, said last named means comprising an auxiliary chamber communicating with said cylinder and said fluid chamber, means including a displaceable member in said auxiliary chamber yieldingly resisting movement of fluid from the head end of said cylinder into said auxiliary chamber, the resistance offered by said last named means being substantially less than that offered by said restricted passage to discharge of fluid therethrough, and means to permit discharge of fluid from said auxiliary chamber to said fluid chamber on displacement of said member in said auxiliary chamber, said auxiliary chamber being connected to the head end of said cylinder and to said fluid chamber on opposite sides of said displaceable member.

6. In a fluid shock absorber for motor vehicles having compression and rebound cylinders and piston means therein, the combination with restricted passage means for discharge of fluid from the head ends of said cylinders into a supply reservoir on development of fluid pressure therein, of means for relieving such fluid pressure on occurrence of slight movement of said piston means from a neutral position on both the compression and rebound strokes thereof, said last named means including auxiliary chamber means communicating with the compression and rebound cylinders, and means including displaceable members in said auxiliary chamber means yieldingly resisting movement of fluid from the head ends of said cylinders into said auxiliary chamber means and offering substantially less resistance than that offered by said restricted passage means to discharge of fluid therethrough, said auxiliary chamber means being connected to the head ends of said cylinders and to said supply reservoir on opposite sides of said displaceable members.

JOHN M. CHRISTMAN.

CERTIFICATE OF CORRECTION.

Patent No. 2,049,689.  August 4, 1936.

JOHN M. CHRISTMAN.

It is hereby certified that error appears in the printed specification of the above numbered patent requiring correction as follows: Page 4, first column, line 3, claim 1, strike out "movable to force the fluid therein through the" and insert instead the words port, and a metering pin on the auxiliary piston; and that the said Letters Patent should be read with this correction therein that the same may conform to the record of the case in the Patent Office.

Signed and sealed this 20th day of October, A. D. 1936.

Leslie Frazer
Acting Commissioner of Patents.

(Seal)